United States Patent
Huang et al.

(10) Patent No.: US 7,751,131 B2
(45) Date of Patent: Jul. 6, 2010

(54) LENS MODULE AND LENS BARREL

(75) Inventors: Chun-Ru Huang, Taipei (TW);
Chien-Yueh Chen, Taipei (TW)

(73) Assignee: AV TECH Corporation, Taipei County (TW)

( * ) Notice: Subject to any disclaimer, the term of this patent is extended or adjusted under 35 U.S.C. 154(b) by 0 days.

(21) Appl. No.: 12/194,549

(22) Filed: Aug. 20, 2008

(65) Prior Publication Data
US 2009/0185296 A1    Jul. 23, 2009

(30) Foreign Application Priority Data
Jan. 21, 2008    (TW) ............................... 97102186 A

(51) Int. Cl.
*G02B 7/02* (2006.01)
(52) U.S. Cl. .................. 359/819; 359/811; 359/820
(58) Field of Classification Search .............. 359/811, 359/819, 820; 396/529; 353/100
See application file for complete search history.

(56) References Cited

U.S. PATENT DOCUMENTS 4,302,076 A * 11/1981 Hashimoto ............... 359/830

* cited by examiner

*Primary Examiner*—Joseph Martinez
(74) *Attorney, Agent, or Firm*—Jianq Chyun IP Office

(57) ABSTRACT

A lens module including a lens barrel, multiple lenses, and multiple cushions is provided. The lens barrel has an assembling opening, an inner wall, and multiple positioning structures. The positioning structures are integrally formed on the inner wall. An internal diameter of the positioning structure adjacent to the assembling opening is greater than an internal diameter of the positioning structure far away from the assembling opening. In addition, the lenses are respectively fixed in the corresponding positioning structure along an assembling direction. Each cushion is disposed in a pitch between two adjacent lenses, and each lens assembled in the lens barrel is disposed at a predetermined position through the positioning structures and cushions.

6 Claims, 3 Drawing Sheets

LENS MODULE AND LENS BARREL

CROSS-REFERENCE TO RELATED APPLICATION

This application claims the priority benefit of Taiwan application serial no. 97102186, filed on Jan. 21, 2008. The entirety of the above-mentioned patent application is hereby incorporated by reference herein and made a part of this specification.

BACKGROUND OF THE INVENTION

1. Field of the Invention

The present invention relates to an optical mechanism, and in particularly, relates to a lens module.

2. Description of Related Art

With the progress of technology, optical devices e.g. cameras or projectors have been widely used in daily life. In the optical devices, the lenses determine the image quality. FIG. 1 is a schematic view of a conventional lens module. Referring to FIG. 1, the conventional lens module 100 includes a lens barrel 110, multiple lenses 120, and multiple rigid spacer rings 130 for positioning. The lenses 120 are disposed in the lens barrel 110, and fixed at predetermined positions in the lens barrel 110 by means of the rigid spacer rings 130. In the design of the lens barrel, the size of the rigid spacer rings 130 must be designed depending on the pitch between the lenses. The lenses are in direct contact with the rigid spacer rings 130 and are fixed in the lens barrel by means of the rigid spacer rings 130, such that each lens in the lens barrel is fixed at a predetermined position.

However, the material of the rigid spacer rings 130 is of high hardness and is difficult to process, so the lenses 120 may be abraded due to the scratches resulting from the assembling. For example, in the course of assembling the lenses 120 and the rigid spacer rings 130 in the lens barrel 110, the lenses 120 may be scratched by the rigid spacer rings 130 due to the incautious operation of the assembling personnel, so as to cause an unsatisfactory image capture quality of the lens module 100. On the other hand, since the material and the requirement of high precision of the dimension of the rigid spacer rings 130 are expensive, the lens module 100 equipped with the rigid spacer rings 130 may have a high production cost.

SUMMARY OF THE INVENTION

The present invention is directed to a lens barrel, having multiple positioning structures integrally formed in a stepped fashion, such that each lens may be fixed at a predetermined positioning structure.

The present invention provides a lens module, in which the abrasion of the lenses therein does not easily occur.

The present invention provides a lens module, having a low production cost.

The present invention provides a lens module, having a simpler manufacturing manner which do not need high precision of the dimension of the spacer rings.

The present invention provides a lens module, which includes a lens barrel, multiple lenses, and multiple cushions. The lens barrel has an assembling opening, an inner wall, and multiple positioning structures. The positioning structures are integrally formed on the inner wall. An internal diameter of the positioning structure adjacent to the assembling opening is greater than an internal diameter of the positioning structure far away from the assembling opening. In addition, the lenses are respectively fixed in the corresponding positioning structure along an assembling direction. Each cushion is disposed between two adjacent positioning structures, and tightly fits the lenses fixed in the corresponding positioning structures.

In an embodiment of the present invention, the positioning structures are arranged in a stepped fashion on the inner wall of the lens barrel.

In an embodiment of the present invention, an external diameter of the positioning structure adjacent to the assembling opening is greater than the external diameter of the positioning structure far away from the assembling opening.

In an embodiment of the present invention, a material of the cushions is an elastic material.

In an embodiment of the present invention, an elasticity of the cushion adjacent to the assembling opening is greater than an elasticity of the cushion far away from the assembling opening.

In an embodiment of the present invention, the lens module further includes a pressing ring disposed at the assembling opening, and tightly fitting the lens adjacent to the assembling opening.

In an embodiment of the present invention, the pressing ring is an elastic pressing ring.

The present invention provides a lens barrel, which includes an assembling opening, an inner wall, and multiple positioning structures. The positioning structures are arranged in a stepped fashion, and integrally formed on the inner wall of the lens barrel.

In the present invention, the multiple positioning structures are formed on the inner wall of the lens barrel for defining the positions of the lenses, and the multiple lenses are assembled in the corresponding positioning structures. In addition, in the present invention, the cushion is disposed between two adjacent positioning structures, and tightly fits the lenses fixed in the corresponding positioning structures, such that each lens assembled in the lens barrel is disposed at a predetermined position.

Compared with the conventional art, the present invention directly forms multiple positioning structures on the inner wall of the lens barrel for defining the positions of the lenses, and adopts the cushions made of e.g. an elastic material to assist the arrangement of each lens in the lens barrel at a predetermined position. Therefore, the present invention does not have the problems that the spacer rings are not easy to process or may cause the scratches on the lenses in the conventional art. Moreover, the material of the cushion of the present invention is cheap. Besides, the precision of the dimension of cushion is not as important as its counterpart in the conventional art, and thus the lens module 100 of the present invention has a relatively low production cost.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
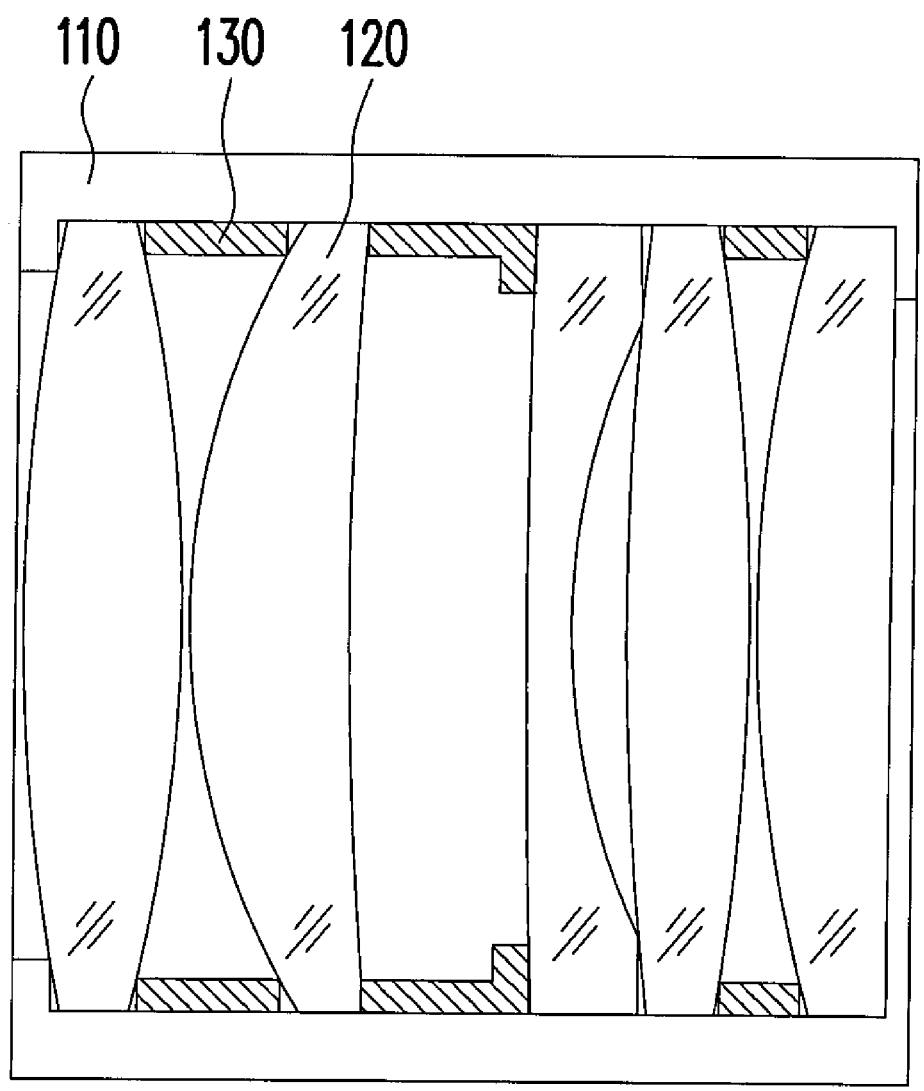
FIG. 1 is a schematic view of a conventional lens module.

Reference will now be made in detail to the present embodiments of the invention, examples of which are illustrated in the accompanying drawings. Wherever possible, the same reference numbers are used in the drawings and the description to refer to the same or like parts.

Figure 2A:
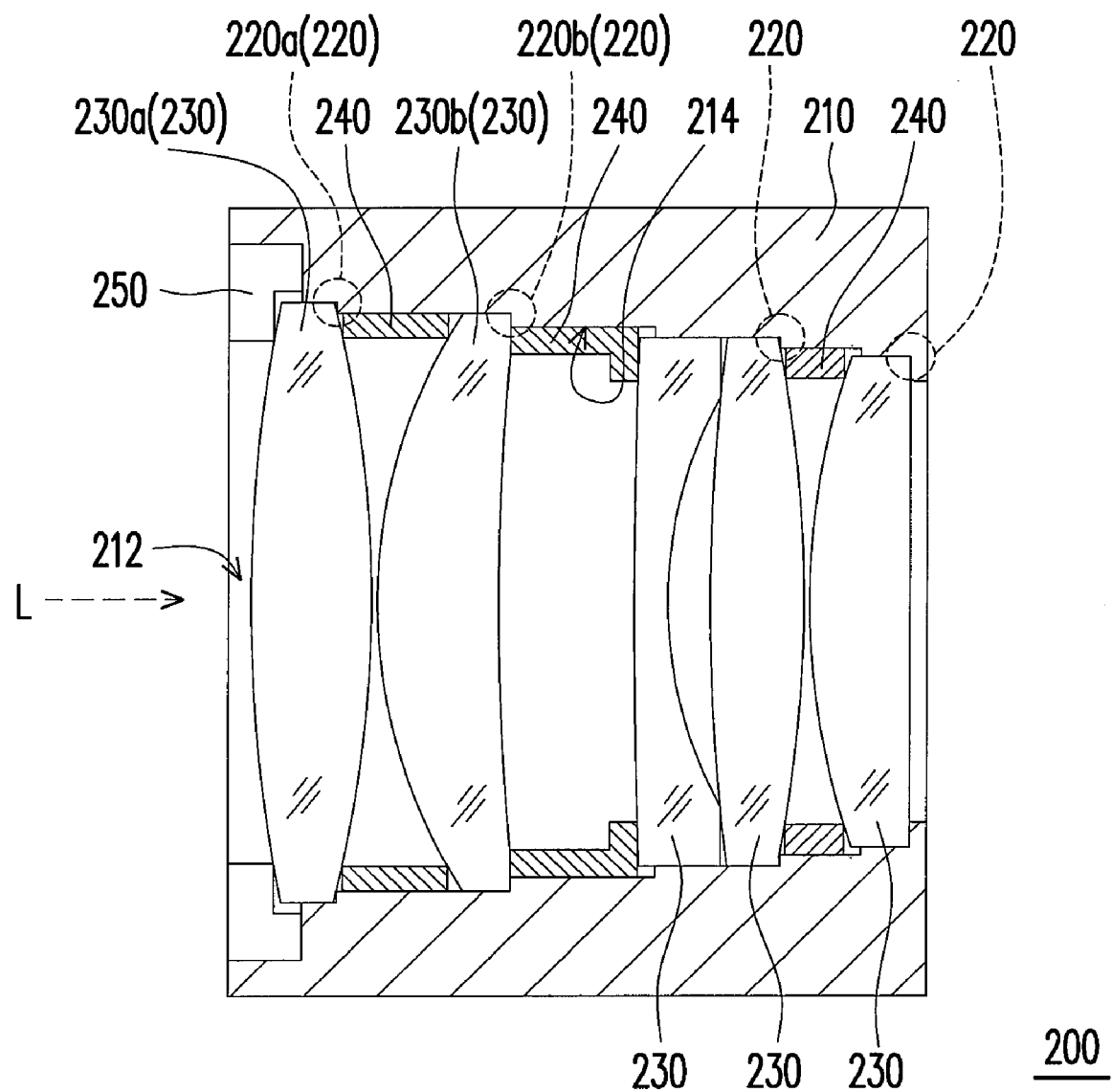
FIG. 2A is a schematic view of a lens module according to an embodiment of the present invention.
Figure 2B:
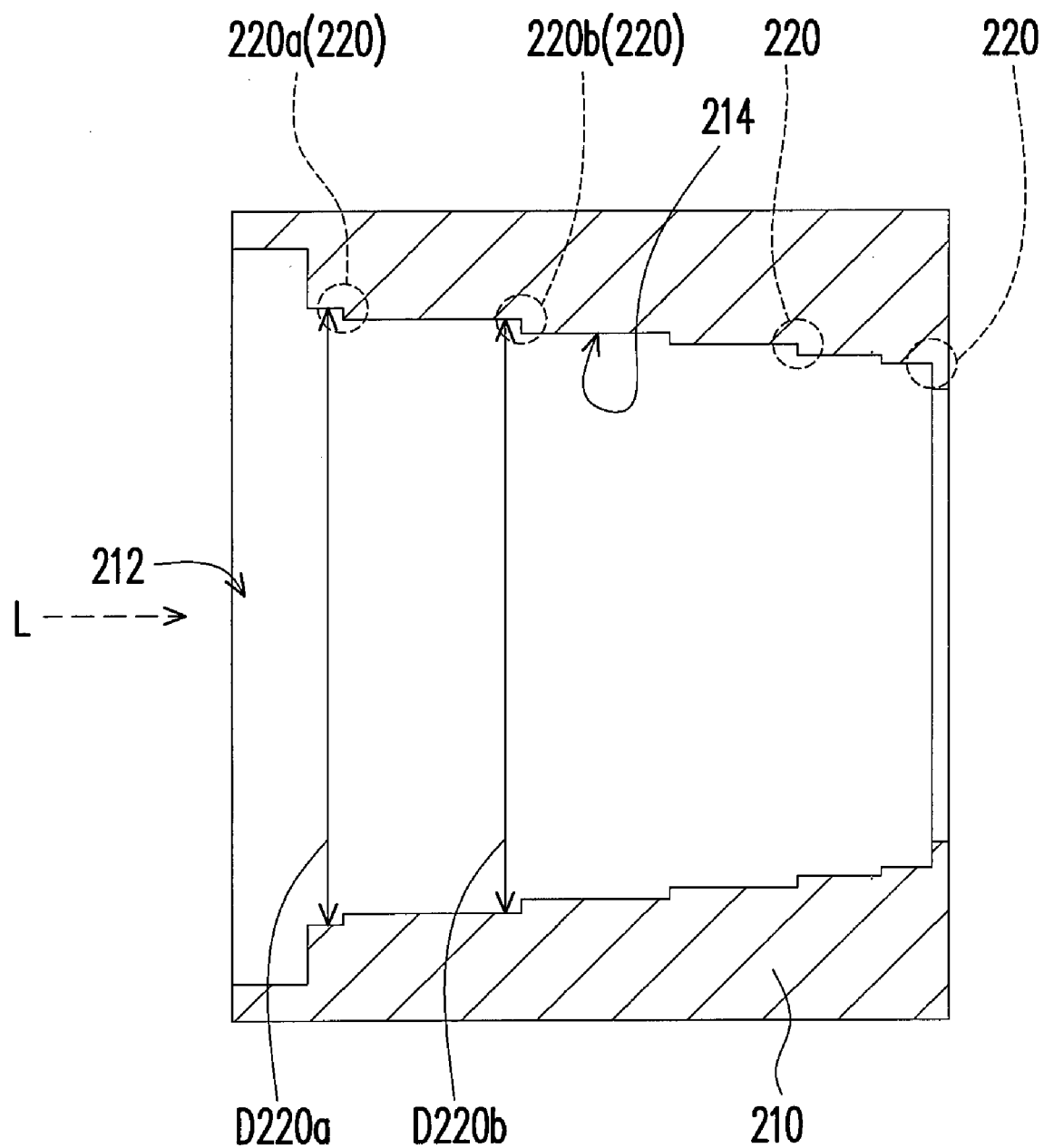
FIG. 2B is a schematic view of the lens barrel of FIG. 2A and positioning structures integrally formed on the inner wall of the lens barrel.

FIG. 2A is a schematic view of a lens module according to an embodiment of the present invention. FIG. 2B is a schematic view of the lens barrel of FIG. 2A and positioning structures integrally formed on the inner wall of the lens barrel. Referring to FIGS. 2A and 2B, the lens module 200 in this embodiment mainly includes a lens barrel 210, multiple positioning structures 220, multiple lenses 230, and multiple cushions 240. The lens barrel 210 has an assembling opening 212 and an inner wall 214, and the positioning structures 220 is integrally formed on the inner wall 214 of the lens barrel 210 when the lens barrel 210 is fabricated. More particularly, the positioning structures 220 are arranged in a stepped fashion on the inner wall 214 of the lens barrel 210. In this embodiment, an internal diameter D220a of the positioning structure 220a adjacent to the assembling opening 212 is greater than an internal diameter D220b of the positioning structure 220b far away from the assembling opening 212. That is, the positioning structure 220 farther away from the assembling opening 212 has a smaller internal diameter.

In addition, the multiple lenses 230 are assembled in the lens barrel 210 through the assembling opening 212, the lenses 230 are assembled into the lens barrel along an assembling direction L, and the lenses 230 are in direct contact with the positioning structures 220 in the lens barrel 210. The positioning structures 220 in this embodiment are arranged in a stepped fashion on the inner wall 214 of the lens barrel 210, i.e., the internal diameter D220a of the positioning structure 220a adjacent to the assembling opening 212 is greater than the internal diameter D220b of the positioning structure 220b far away from the assembling opening 212. Therefore, in order to successfully assemble the lenses 230 in the corresponding positioning structures 220, an external diameter of the lens 230 assembled in the lens barrel 210 is designed according to the internal diameter of the corresponding positioning structure 220, i.e., the lens 230 farther away from the assembling opening 212 has a smaller external diameter. In this embodiment, the lenses 230 are spaced by the positioning structures 220 in the lens barrel, instead of the conventional rigid spacer rings 130. The size of the positioning structures 220 is designed according to the pitch between the lenses. Therefore, by the use of the positioning structures 220, the lenses directly contacts the positioning structures 220, and a pitch is generated between the lenses, and thus the cushions 240 made of the elastic material are placed in the pitches between the lenses.

Moreover, the cushions 240 in this embodiment are made of the elastic material, and each cushion 240 is disposed between two adjacent positioning structures 220 and tightly fits the lens 230 fixed on two adjacent positioning structures 220. Since the cushion 240 is made of the elastic material, and tightly fits the lens 230 fixed on two adjacent positioning structures 220, the cushion 240 between two adjacent positioning structures 220 may effectively prevent the shift of the position of the lenses 230 caused by inappropriate shaking of the lens module 100. Hereinafter, the manner of accurately disposing the lenses 230 at the predetermined positions in the lens barrel 210 with the assist of the positioning structures 220 and the cushions 240 will be illustrated in detail.

Based on the above, in this embodiment, two lenses 230a, 230b which are nearest to the assembling opening 212 and the corresponding positioning structures 220a, 220b are taken as an example for illustration. During the assembly of the lens module 200, after the corresponding lens 230b is disposed on the positioning structure 220b, in this embodiment, a cushion 240 is placed behind the lens 230b, and then the corresponding lens 230a is disposed on another positioning structure 220a behind the positioning structure 220b. The original width of the cushion 240 between the lenses 230a and 230b is, for example, greater than the distance between the lenses 230a and 230b. Therefore, when the lens 230a is disposed in the corresponding positioning structure 220a, the cushion 240 is elastically compressed between the lens 230a and the lens 230b. Afterwards, in this embodiment, a pressing ring 250 (e.g. an elastic pressing ring) is further disposed at the assembling opening 212 to limit all the lenses 230 and the cushions 240 in the lens barrel 210. The pressing ring 250 in this embodiment may, for example, elastically compress the lens 230a adjacent to the assembling opening 212, such that the lens 230a is accurately disposed at a predetermined position in the lens barrel 210 by means of the positioning structure 220a.

It should be noted that, after the pressing ring 250 elastically compresses the lens 230a adjacent to the assembling opening 212 (i.e., the pressing ring 250 tightly fits the lens 230a adjacent to the assembling opening 212), the lens 230a adjacent to the assembling opening 212 may compress the cushion 240 before the lens 230a, and accordingly the cushion 240 urges against another lens 230b in contact with the cushion 240, such that the lens 230b is firmly fixed in the corresponding positioning structure 220b. Definitely, other lenses 230 in the lens barrel 210 may also be fixed at predetermined positions in the lens barrel 210 with the assist of the corresponding positioning structures 220 and the cushions 240.

More particularly, in this embodiment, the elasticity of the cushion 240 adjacent to the assembling opening 212 is, for example, greater than the elasticity of the cushion 240 far away from the assembling opening 212. Therefore, the lenses 230 assembled in the lens barrel 210 may be effectively fixed in the corresponding positioning structures 220 with the assist of the cushions 240.

In view of the above, in the present invention, the multiple positioning structures are formed on the inner wall of the lens barrel for defining the positions of the lenses, and the multiple lenses are assembled in the corresponding positioning structures. In addition, in the present invention, the cushion is disposed between two adjacent positioning structures, and tightly fits the lenses fixed in the positioning structures, such that each lens assembled in the lens barrel is firmly disposed at a predetermined position. Also, the cushions may effectively prevent the shift of the position of the lenses 230 due to inappropriate shaking of the lens module 100. Compared with the conventional art, the lens module of the present invention has the following advantages.

(1) In the present invention, multiple positioning structures are directly formed on the inner wall of the lens barrel for defining the positions of the lenses when the lens barrel is fabricated, so as to accurately dispose the lenses at predetermined positions in the lens barrel. Compared with the conventional art in which the rigid spacer ring used for positioning is difficult to fabricate, the lens module of the present invention has a simpler processing manner.

(2) Since the lenses in the present invention are fixed at predetermined positions in the lens barrel with the assist of the positioning structures integrally formed on the inner wall of the lens barrel and the cushions made of the elastic material, the inappropriate abrasion and scratch of the lenses will not easily occur, and thus the lens module may have a better image capture quality.

(3) Since the material of the cushions is the elastic material of low price, compared with the expensive rigid spacer ring used for positioning in the conventional art, the lens module of the present invention has a low production cost.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A lens module, comprising:
    a lens barrel, having an assembling opening, an inner wall, and multiple positioning structures, wherein the positioning structures are integrally formed on the inner wall, and an internal diameter of a positioning structure of the multiple positioning structures immediately adjacent to the assembling opening is greater than internal diameters of remaining positioning structures of the multiple positioning structures;
    multiple lenses, respectively fixed in the corresponding positioning structure along an assembling direction; and
    multiple cushions, disposed between two adjacent positioning structures, and tightly fitting the lenses fixed in the corresponding positioning structures, wherein elasticity of a cushion of the multiple cushions immediately adjacent to the assembling opening is greater than elasticity of the remaining cushions of the multiple cushions.

2. The lens module according to claim 1, wherein the positioning structures are arranged in a stepped fashion on the inner wall of the lens barrel.

3. The lens module according to claim 1, wherein an external diameter of a lens of the multiple lenses immediately adjacent to the assembling opening is greater than external diameters of remaining lenses of the multiple lenses.

4. The lens module according to claim 1, wherein a material of the cushions is an elastic material.

5. The lens module according to claim 1, further comprising a pressing ring disposed at the assembling opening, and tightly fitting the lens adjacent to the assembling opening.

6. The lens module according to claim 5, wherein the pressing ring is an elastic pressing ring.

* * * * *